United States Patent
Sliwa

(10) Patent No.: US 8,950,818 B2
(45) Date of Patent: Feb. 10, 2015

(54) VEHICLE SEAT

(71) Applicant: Faurecia Autositze GmbH, Stradthagen (DE)

(72) Inventor: Christof Jan Sliwa, Schongau (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/904,702

(22) Filed: May 29, 2013

(65) Prior Publication Data

US 2013/0334849 A1 Dec. 19, 2013

(30) Foreign Application Priority Data

May 30, 2012 (DE) .......................... 10 2012 010 690

(51) Int. Cl.
*B60N 2/44* (2006.01)
*A47C 7/14* (2006.01)

(52) U.S. Cl.
CPC ................ *B60N 2/44* (2013.01); *B60N 2/4415* (2013.01); *B60N 2/448* (2013.01); *Y10S 297/03* (2013.01)
USPC ................................ 297/452.41; 297/DIG. 3

(58) Field of Classification Search
USPC ......................................... 297/452.41, DIG. 3
See application file for complete search history.

(56) References Cited

U.S. PATENT DOCUMENTS

| 3,496,047 | A | * | 2/1970 | Walter | 156/360 |
| 3,769,780 | A | * | 11/1973 | Kasten | 96/387 |
| 4,832,039 | A | | 5/1989 | Perry | |
| 5,806,928 | A | * | 9/1998 | Gattuso et al. | 297/284.6 |
| 6,347,147 | B1 | * | 2/2002 | Downs et al. | 381/114 |

FOREIGN PATENT DOCUMENTS

| EP | 1411244 | 4/2004 |
| WO | 2011015954 | 2/2011 |

* cited by examiner

*Primary Examiner* — Milton Nelson, Jr.
(74) *Attorney, Agent, or Firm* — Bourque and Associates, PA

(57) ABSTRACT

A vehicle seat having at least one pneumatically operated system for massage and/or for seat adjustment, in particular for adjusting the seat area. The at least one pneumatic system includes at least one bubble element that can be filled with a gaseous medium, especially air. The interior of the bubble element can be filled or evacuated via a supply line mounted at the bubble element through an inlet opening into the bubble element. A gas-permeable acoustic element is provided in the inlet opening.

2 Claims, 2 Drawing Sheets

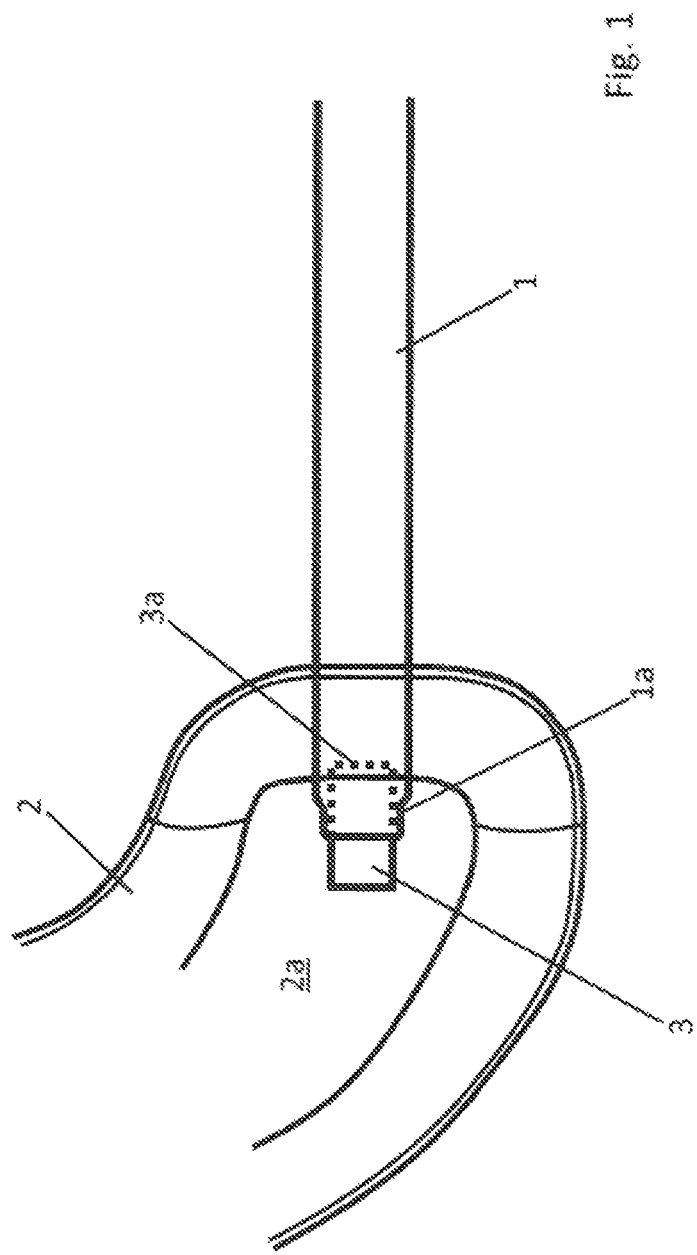

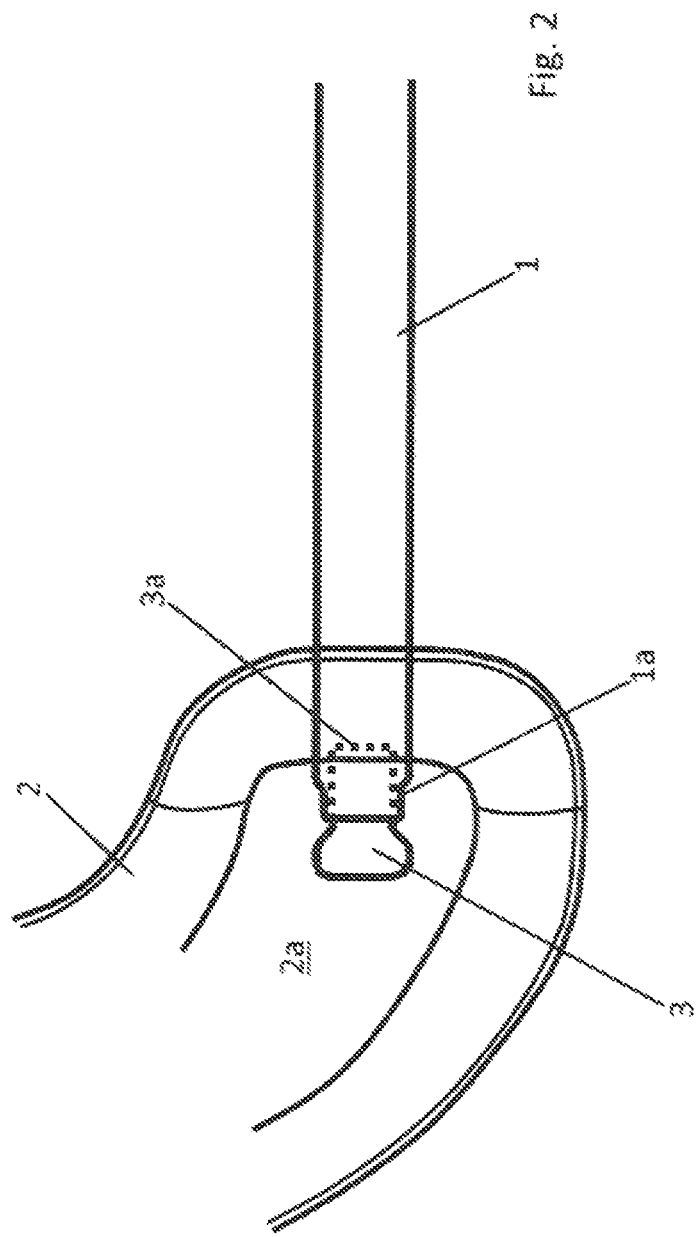

VEHICLE SEAT

TECHNICAL FIELD

The invention relates to a vehicle seat and in particular, to a vehicle seat having at least one pneumatically operated system for massage and/or for seat adjustment, wherein the at least one pneumatic system includes at least one bubble element that can be filled or evacuated with a gaseous medium such as air via a supply line through an inlet opening mounted at the bubble element.

BACKGROUND INFORMATION

Vehicle seats often have pneumatic systems, where bubbles in the seat are filled with air to implement, for example massage functions or seat adjustments. Especially when filling the bubble element with air, but also evacuating the same, leads to the development of noise, which is often sensed as a disturbance, in particular if the bubble elements are located close to the ear, for example for a neck massage element.

Known from U.S. Pat. No. 4,832,039, for example, is a sound insulation for a blood monitoring device, which uses as a sound suppressor a resonator in order to suppress the propagation of sound for the suction line and the discharge line of a pump. In WO2011/015954 A1, a resonance filter is place before the pump on the suction side to operate a fog machine. Known from EP 1 411 244 A2 is a sound suppressor consisting of a rolled up knitted fabric inserted into the air line and in addition an air flow restrictor connected to the opening side.

The aforementioned embodiments require several additional components and are relatively expensive. Furthermore, a vehicle seat of the kind mentioned above typically does not offer much installation space for complex external components.

SUMMARY

The object of the invention is to create a vehicle seat of the aforementioned kind with a pneumatic system that is provided with effective noise suppression in a simple manner that does not require additional installation space.

According to the invention, an acoustic element is provided that is placed into the inlet opening of the bubble element. This acoustic element is permeable to gas such that the fill medium for the bubble element, especially air, can be guided through the acoustic element. Porous materials that can be used are foams, plastics, e.g., POM, and metals, in particular brass. The porous material of the acoustic element acts as a flow resistance in the inlet and/or outlet line and provides a uniform air supply or air removal. The air flow through the pores is significantly quieter, and especially the air blasts when switching respective valves for the bubble element's air supply or air removal are dampened.

The invention can be used for all popular bubble elements and can also be retrofitted. No additional installation space is required because the acoustic element according to the invention at most protrudes into the bubble element. If the acoustic element protrudes into the bubble element, the protruding section can be widened compared to the remaining section in order to allow for a greater surface for the suction or discharge of the fill medium, especially air.

BRIEF DESCRIPTION OF THE DRAWINGS

These and other features and advantages of the present invention will be better understood by reading the following detailed description, taken together with the drawings wherein:

FIG. 1 shows a section of a pneumatic system as part of a vehicle seat according to the invention with a section of the bubble element and a supply line emptying into said bubble element with a first acoustic element; and FIG. 2 shows a section of a pneumatic system as part of a vehicle seat according to the invention with a section of the bubble element and a supply line emptying into said bubble element with a second acoustic element.

DETAILED DESCRIPTION OF THE PREFERRED EMBODIMENTS

FIGS. 1 and 2 each show a section of a bubble element 2 that can be filled with a gaseous medium, especially air. A supply line 1 having an inlet opening 1a and emptying into the bubble element 2 is used for this purpose. The gaseous medium can thus enter the interior 2a of the bubble element 2 via the supply line 1 and can be withdrawn therefrom via the same path for evacuating the bubble element 2. The supply line 1 and the bubble element 2, several of which can be present, are parts of the pneumatic system of a vehicles seat—not shown in detail but well known to those skilled in the art. They are used for implementing massage functions, especially in the head and neck areas, and/or to implement all possible seat adjustments, for example lumbar adjustments.

In the examples shown, a gas-permeable, especially an air-permeable, acoustic element 3, which is in part accommodated in the supply line 1 as indicated by the dashed line 3a, is provided in the inlet opening 1a of the supply line 1. Preferably, the acoustic element protrudes into the interior 2a of the bubble element 2. The acoustic element 3 can have an approximately cylindrical shape (FIG. 1) but can also be widened relative to the opening 1a (FIG. 2) such that the acoustic element 3 has the shape of a mushroom, for example.

The acoustic element 3 is gas-permeable such that it is possible to fill or withdraw air via the supply line 1 through the acoustic element 3. During the filling or evacuating procedure, the acoustic element 3 dampens the noise development and in addition prevents bubble element 2 or the supply line 1 from filling to quickly when the valve (not shown) is opened by first filling the fine pores of the acoustic element, before air enters the inflating element 2 during filling or the supply line 1 during emptying. In addition, the flow resistance generated by the acoustic element 3 allows for a more uniform filling or emptying. Hissing and filling noises are avoided.

When the acoustic element 3 protrudes into the interior 2a of the bubble element 2, the surface over which the air is taken into the supply line 1 or is provided to the bubble element 2 is enlarged, especially with the widened embodiment according to FIG. 2.

The porous, gas-permeable acoustic element 3, which can be made, for example, of foam material, plastic, e.g., POM, or metal, e.g., brass, can be retrofitted for existing systems and compared to conventional solutions for sound suppression does not require additional installation space, because it is placed inside, in the existing bubble element 2, and/or the inlet opening 1a of the supply line.

Modifications and substitutions by one of ordinary skill in the art are considered to be within the scope of the present invention, which is not to be limited except by the allowed claims and their legal equivalents.

The invention claimed is:

1. A vehicle seat having at least one pneumatically operated system, wherein the at least one pneumatically operated system includes at least one bubble element (2) that can be filled with a gaseous medium, especially air, and has an interior (2a)

that can be filled or evacuated via a supply line (1) that is mounted at the bubble element (2) and through an inlet opening (1*a*) that empties into the bubble element (2), characterized in that a gas-permeable acoustic element (3) is provided in the inlet opening (1*a*) and wherein at least one section of the gas-permeable acoustic element (3) protrudes from the inlet opening (1*a*) into the bubble element (2), wherein the section of the gas-permeable acoustic element (3) that protrudes into the bubble element (2) has a diameter at least in one section that is wider than a diameter of the inlet opening (1*a*).

2. The vehicle seat as in claim 1, characterized in that the acoustic element (3) is made of a material selected from the group consisting of foam material, plastic material or metal.

\* \* \* \* \*